United States Patent [19]

Ledford

[11] Patent Number: 5,367,819
[45] Date of Patent: Nov. 29, 1994

[54] LINE RELEASING FISHING FLOAT

[76] Inventor: James T. Ledford, 1339 Old Columbia Rd., Columbia, Tenn. 37024

[21] Appl. No.: 30,587

[22] Filed: Mar. 12, 1993

[51] Int. Cl.⁵ ............................................. A01K 93/00
[52] U.S. Cl. .................................................. 43/43.11
[58] Field of Search ........................... 43/43.11, 44.87

[56] References Cited

U.S. PATENT DOCUMENTS

| | | | |
|---|---|---|---|
| 2,678,511 | 5/1954 | Wright | 43/43.11 |
| 3,106,797 | 10/1963 | Hancock | 43/43.11 |
| 3,144,729 | 8/1964 | Jonassen | 43/43.11 |
| 3,425,151 | 2/1969 | Salfer | 43/43.11 |
| 3,613,289 | 10/1971 | Wehren | 43/43.11 |
| 3,832,797 | 9/1974 | Smedley | 43/43.11 |
| 4,199,889 | 4/1980 | Van Orden et al. | 43/43.11 |
| 4,406,081 | 9/1983 | Garner | 43/43.11 |
| 4,571,878 | 2/1986 | Nyman | 43/43.11 |
| 4,574,515 | 3/1986 | Garner | 43/43.11 |

FOREIGN PATENT DOCUMENTS

| | | |
|---|---|---|
| 546183 | 9/1957 | Canada . |
| 800436 | 7/1936 | France . |
| 188671 | 4/1964 | Sweden . |

*Primary Examiner*—Kurt C. Rowan
*Attorney, Agent, or Firm*—Rick R. Wascher

[57] ABSTRACT

The invention is a line releasing fishing float and kit. The invention includes a line ring, attached to or for attachment to the body of an at least hemispherical fishing float, and a line catch disk. The line ring and line catch disk, and optionally, a float and an amount of adhesive, comprise the components of the inventive line releasing fishing float kit.

18 Claims, 2 Drawing Sheets

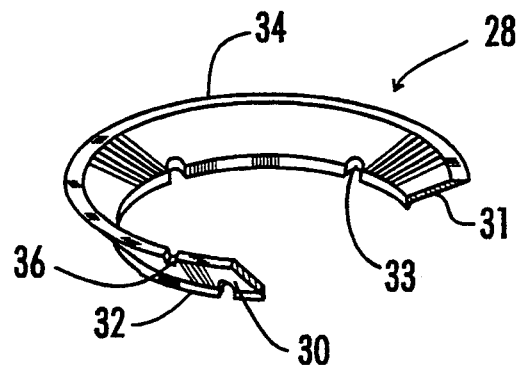
FIG. 6
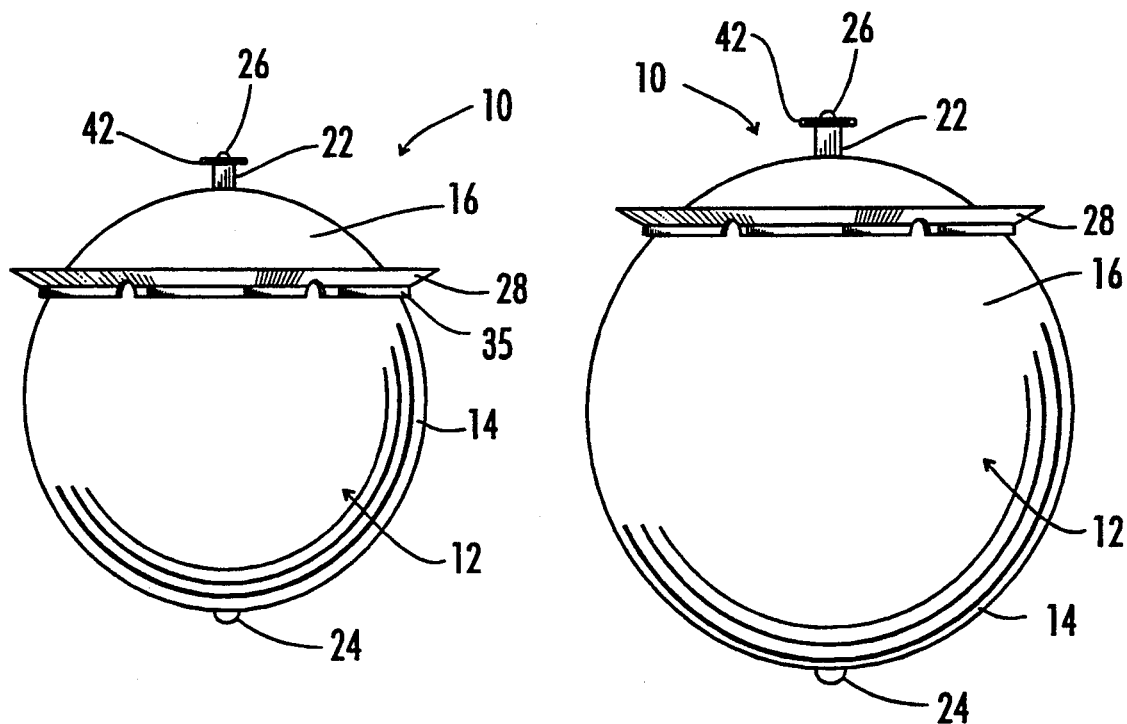
FIG. 7
FIG. 8

LINE RELEASING FISHING FLOAT

This application is a substitute application for the previously filed parent application having the Ser. No. 07/886,190, filed on May 21, 1992, now abandoned.

BACKGROUND OF THE INVENTION

1. Field of the Invention

The present invention relates generally to fishing floats, and more particularly to fishing floats capable of automatically releasing a length of line wrapped around the body of the float after the float is cast into a pond, stream or lake

2. Description of the Related Art

A common problem experienced by fisherman of all ages is the inability to accurately and easily cast a fishing float with a long length of line hanging below the float.

The problem is further aggravated when one considers that a number of fishing hot spots incorporate overhanging limbs, electrical or telephone cables, or other obstructions in the flight path of the fishing float such that the fisherman casting the float with the long length of line often tangles the line with the overhanging obstruction.

Various devices have been invented in an attempt to remedy the problem, but such devices differ significantly from the well-known floats called "bobbers", having a spherical body, a centrally disposed spring mechanism with upper and lower eyes. The popularity of bobbers can be attributed to the ease with which they are installed and positioned along a fishing line. The popular bobber, however, does not solve or address the above-mentioned problem.

The list that follows is directed to a variety of fishing floats or bobbers found in the related art.

| U.S. PAT. NO. | INVENTOR |
| --- | --- |
| 2,678,511 | Wright |
| 3,106,797 | Hancock |
| 3,144,729 | Jonassen |
| 3,425,151 | Salfer |
| 3,613,289 | Wehren |
| 3,832,797 | Smedley |
| 4,199,889 | Van Orden et al. |
| 4,405,081 | Garner |
| 4,571,878 | Nyman |
| 4,574,515 | Garner |

In addition to the devices disclosed in the aforementioned U.S. patents, Swedish Patent No. 188671 is directed to a fishing float; Canadian Patent No. 546,183 is directed to a fishing float; and, French Patent No. 800.436 is directed to a fishing float.

SUMMARY OF THE INVENTION

The present invention is directed to a fishing float, a kit for modifying the a fishing float or bobber described above. As used herein the terms float or bobber may be used synonymously to describe fishing floats. The invention also incorporates various new and useful structural components.

The preferred embodiment of the invention has an at least hemispherical, but generally spherical, body with upper and lower hemispheres. A spring-loaded post extends through the body along the central axis of the upper and lower hemispheres.

The spring-loaded post has an axially disposed rod portion, a spring component, a push button portion, and upper and lower eyelets. In its rest position, the button protrudes from the float body in an extended position with one of the eyelets engaging the body of the invention and the other engaging the spring-biased button.

A line ring is formed integral with or otherwise fastened to the body of the bobber of float. The line ring preferably has a beveled configuration such that one open end of the ring has a first diameter and the second open end of the ring has a second diameter smaller than the first. Ideally, the smaller diameter portion of the ring is the portion that contacts the body of the invention and forms a line wrapping groove therewith. The line ring is positioned so that the spring-loaded post is substantially centered with respect to the open portion of the ring.

A line catch disk having a flat wafer-like configuration is attached to the spring-loaded button component. The line catch disk is configured in a variety of ways. In the preferred embodiment, the line catch disk has a circular wafer-like configuration with a cut-away portion. In the alternate embodiments of the line catch disk, the disk is configured similar to a flat washer with notches, a flat washer with a portion broken away, or a wafer-like disk with apertures to receive one of the eyelets of the invention and having notches formed therein.

The inventive kit included within the scope of the invention incorporates at least one line ring, at least one line catch disk and preferably an amount of adhesive to apply the ring and disk to the body of a conventional bobber of the type described above, in a package. The kit may also include a conventional bobber, but the kit is useful with a plurality of fishing floats and should not be construed as limited to the conventional bobber.

In the preferred embodiment of the invention, the line ring has a series of openings to enable water to flow therethrough, when the line ring is submerged when using the invention. If submerged, it is believed that an air pocket could become trapped under the line ring and perhaps cause it to float in an undesired fashion.

It is an object of the present invention to provide an improved fishing float.

It is a further object of the present invention to provide a kit to modify commercially available fishing floats to operate and function in the manner contemplated by the apparatus of the present invention.

It is a further object of the present invention to provide the fisherman with a fishing float capable of being used in closed-in or tight places.

It is a further advantage of the present invention to provide the fisherman with a fishing float that holds a length of line about the body of the float during casting.

It is a further advantage of the present invention to provide a fishing float with a means to automatically release fishing line wrapped around its body when the float contacts the water or immediately prior thereto but after the casting operation by the fisherman.

These and other objects and advantages will become apparent in light of the description and claims disclosed herein. The additional objects and advantages are considered to be part of the present invention and to be included as part of the teachings contained herein.

BRIEF DESCRIPTION OF THE DRAWINGS

FIG. 6 is a fragmentary perspective view of the line ring of the present invention;

FIG. 7 is a side view of an alternate embodiment of the present invention shown with the line ring positioned close to the equator of the spherical embodiment; and FIG. 8 is a side view of the present invention shown with the line ring of FIG. 7 positioned further above the equator of the float.

DETAILED DESCRIPTION OF THE PREFERRED EMBODIMENTS

Figure 2:
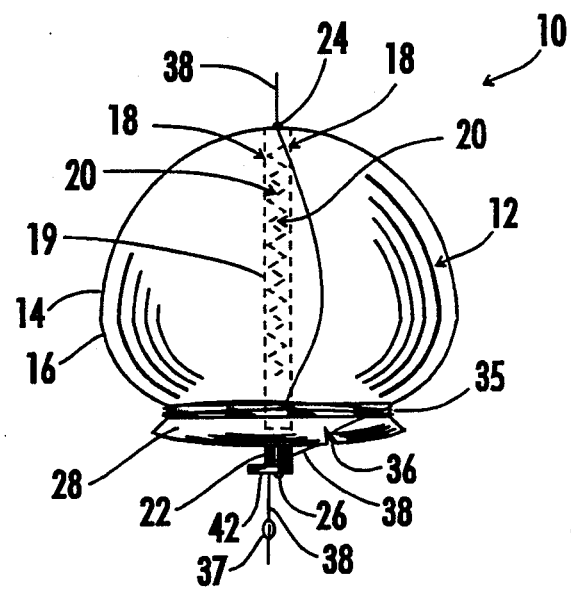
FIG. 2 is a side view of the present invention shown with a length of line wrapped around the body of the present invention like that described in FIG. 1.
Figure 1:
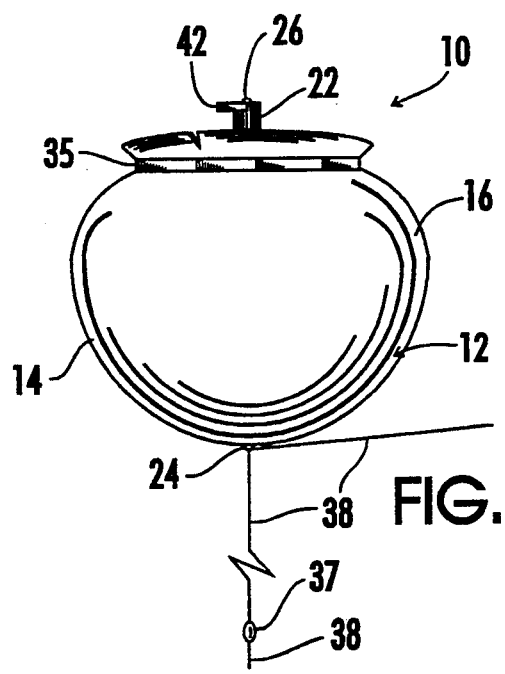
FIG. 1 is a side view of the present invention shown with a length of line passing through the upper eye of the invention.
Figure 3:
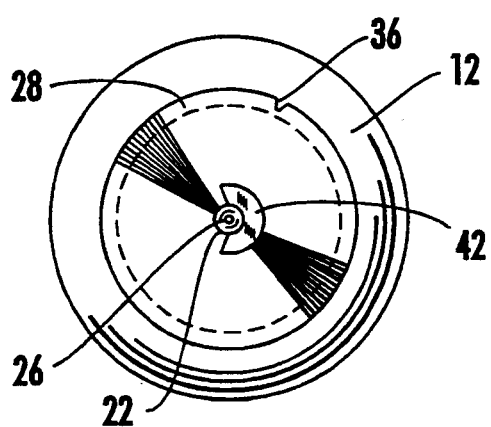
FIG. 3 is a bottom view of the present invention of FIG. 2 shown with the line removed therefrom.
Figure 4:
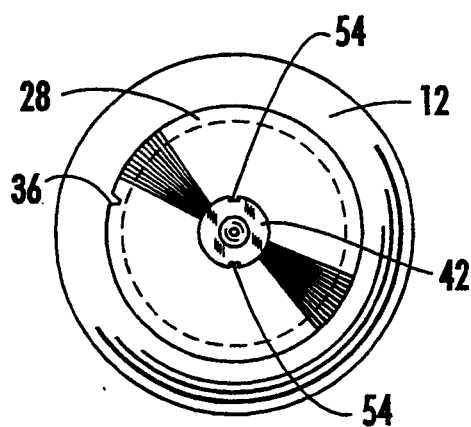
FIG. 4 is a bottom view of the present invention like that shown in FIG. 3 but having an alternate embodiment of the line catch disk attached thereto.
Figure 5:
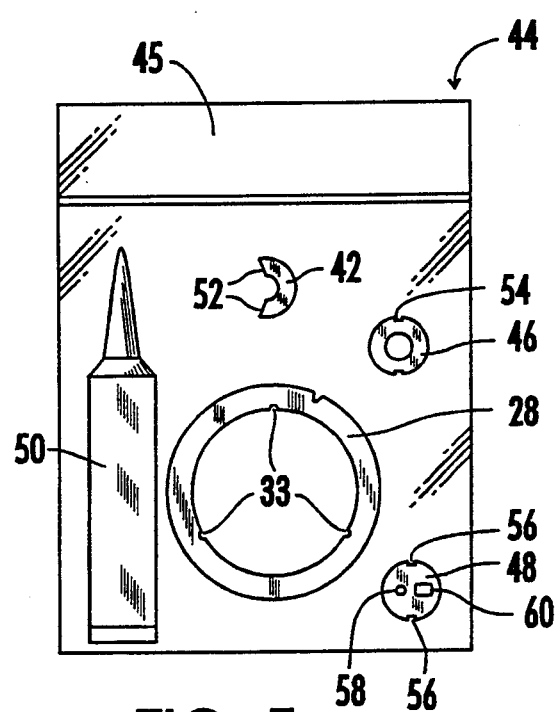
FIG. 5 is a representational view of an embodiment of the kit of the present invention.

An inventive fishing float, designated generally by the reference numeral 10 is shown in FIGS. 1, 2, 7, and 8. The inventive float 10 has a substantially spherical body 12 with upper and lower hemispherical components 14 and 16, respectively.

A spring-loaded post 18 (see FIG. 2) has an axial rod component 19, a spring component 20 (shown in the dashed lines FIG. 2), and a push button portion 22. An axially positioned upper eyelet 24 is opposite the axially positioned lower eyelet 26. In the preferred embodiment, the lower eyelet 26 positively engages the push button component 22.

A line ring 28, see FIGS. 1 through 4, is positioned on the body 12 of the invention 10.

With reference to FIG. 6, the preferred line ring 28 has a beveled side wall 30, a body-enaging smaller opening end 32, at least one aperture 33, a larger opening end 34, aperture, and groove wall 31.

It is also contemplated that the line ring can be a straight cylindrical member without a bevel. The bevel, however, provides an efficient means to seat the windings of the fishing line against the body of the invention within the groove 35, but a straight cylindrical ring portion would also work.

At least one notch 36 is formed in the line ring. As shown in FIG. 2, a length of fishing line 38 is passed through the upper eye 24, extended downward toward the line ring 28, wrapped around the groove interface 35 between the body 12 and line ring 28, then through the notch 36 and draped over the preferred embodiment of the line catch disk 42, forming an angle therewith, and allowed the hang freely therefrom, with weight 37, without engaging or passing through the lower eye 26. That is, in use, the line is wrapped in the manner described above and indicated in FIG. 2 but does not utilize the lower eye 26 for operation.

The alternate embodiments of the line catch disk described below have notches or other surfaces allowing the line to drape over or through to prevent unwrapping of the line from the groove, in much the same manner as described above.

Kit designated generally by the reference numeral 44 includes at least one line ring 28 formed in accordance with the teachings set forth above, a series of line disks 42, 46 and 48, and adhesive 50, in a package 45. Of course, the kit may eliminate the adhesive. The various embodiments of the line catch disks exhibit different structural features.

With respect to line catch disk embodiment designated by reference numeral 42, it is generally shaped like a flat washer having a portion cut away. Edge 52 is the area in which the line 38 contacts when it is draped over the disk as described above and shown in FIG. 2.

With respect to line catch disk embodiment designated by reference numeral 46, slots 54 receive the line in much the same fashion as flat 52 of embodiment 42.

Still further, with respect to line catch disk embodiment designated by the reference numeral 48, slots 56 are similar to slots 54 of embodiment 46, but embodiment 48 also incorporates apertures 58 and 60. Apertures 58 and 60 receive lower eye 26 when the user depresses button 22 but allow eye 26 to protrude away from the button upon depression, and the eye 22 is inserted through aperture 60 and engages aperture 58. In this fashion, the user need not use adhesive 50 to install the line catch disk.

With respect to the other embodiments, the line catch disk designated by reference numerals 42 and 46, the user may require adhesive 50 to attach those disks to the button portion 22.

What is claimed is:

1. A fishing float for engagement with a fishing line comprising:
   a substantially hemispherical body;
   a line ring attached to said body;
   eye means for engagement with a fishing line;
   notch means on said line ring for engagement with a fishing line;
   groove means defined by said line ring and said body for wrapping a fishing line therein and about a portion of said body; and
   disk means for engagement with the fishing line to prevent the line from unwrapping from said groove; and
   wherein the fishing float has a push-button assembly and said disk means is attached to said push-button assembly.

2. The fishing float of claim 1 wherein said body is substantially spherical.

3. The fishing float of claim 2 wherein said disk means is a line catch disk.

4. The fishing float of claim 3 wherein said line catch disk is at least circular in shape and having a central opening.

5. The fishing float of claim 3 wherein said line catch disk has at least one slot.

6. The float of claim 1 wherein said line ring has at least one aperture means for allowing water to flow therethrough.

7. A kit for making a line releasing fishing float comprising in a package:
   a line ring with at least one notch in its circumference adapted to fit around a substantially hemispherical float to form a groove for guiding a fishing line;
   at least one at least partially circular line catch disk having at least one notch therein for additionally guiding said fishing line and adapted to fit with a push-button via an eye onto one end of a rod spring assembly running through said float to an eye on an opposing surface of said float.

8. The kit of claim 7 wherein said line ring has at least one slot in the circumference thereof and at least one drainage orifice therein.

9. The kit of claim 7 wherein said float is part of said kit.

10. The kit of claim 9 wherein said float is spherical.

11. The kit of claim 8 wherein said at least partially circular line catch disk is circular and has at least one aperture formed therein.

12. The kit of claim 7 wherein said at least partially circular line catch disk has a cut-away section to make an incomplete circle.

13. The kit of claim 7 wherein said at least one at least partially circular line catch disk includes a circular line catch disk having opposing slots in the circumference thereof; a circular line catch disk having a central opening and at least one slot in the circumference thereof; and a line catch disk having a cut-away portion to make an incomplete circle.

14. A line releasing fishing float for engagement with a fishing line, comprising:
a substantially hemispherical body;
line ring means attached to said body for wrapping a fishing line around at a portion of said body;
disc means for engagement with the fishing line to prevent unwrapping of the fishing line from at least a portion of said body; and
eye means opposite said line ring means and said line catch disc means for securing a portion of the fishing line to said body; and wherein the fishing line float has a push-button assembly and said disc means is attached thereto.

15. The fishing float of claim 14 wherein said disk means is a line catch disk.

16. The fishing float of claim 15 wherein said line catch disk is at least circular in shape and having a central opening.

17. The fishing float of claim 15 wherein said line catch disk has at least one slot.

18. The float of claim 14 wherein said line ring has at least one aperture means for allowing water to flow therethrough.

* * * * *